United States Patent
Janssen

(10) Patent No.: US 7,345,699 B2
(45) Date of Patent: Mar. 18, 2008

(54) METHOD AND DEVICE FOR PRODUCING ROAD AND STREET DATA FOR A DIGITAL MAP

(75) Inventor: Holger Janssen, Hessisch Oldendorf (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 10/025,014

(22) Filed: Dec. 19, 2001

(65) Prior Publication Data

US 2002/0085095 A1    Jul. 4, 2002

(30) Foreign Application Priority Data

Dec. 28, 2000  (DE) ................. 100 65 593

(51) Int. Cl.
*H04N 7/18*    (2006.01)
(52) U.S. Cl. ..................................... 348/148
(58) Field of Classification Search ............... 348/148, 348/135, 149, 143, 119, 113, 137, 136, 118; 382/104, 199, 103; 701/208, 213, 117, 228, 701/223, 210, 201
See application file for complete search history.

(56) References Cited

U.S. PATENT DOCUMENTS

| | | | | |
|---|---|---|---|---|
| 5,922,036 A * | 7/1999 | Yasui et al. | ..................... | 701/28 |
| 5,948,042 A * | 9/1999 | Heimann et al. | ............. | 701/208 |
| 6,047,234 A * | 4/2000 | Cherveny et al. | ............ | 701/200 |
| 6,057,754 A * | 5/2000 | Kinoshita et al. | ............ | 340/435 |
| 6,157,342 A * | 12/2000 | Okude et al. | ........... | 342/357.13 |
| 6,205,234 B1 * | 3/2001 | Kakinami et al. | ........... | 382/104 |
| 6,385,539 B1 * | 5/2002 | Wilson et al. | ............... | 701/213 |
| 6,470,265 B1 * | 10/2002 | Tanaka | ......................... | 701/208 |
| 6,577,334 B1 * | 6/2003 | Kawai et al. | ................ | 348/148 |
| 2002/0094825 A1 * | 7/2002 | Endo et al. | ................... | 455/456 |
| 2004/0022416 A1 * | 2/2004 | Lemelson et al. | ........... | 382/104 |

FOREIGN PATENT DOCUMENTS

EP        0 921 509 A2    6/1999

OTHER PUBLICATIONS

K.P Schwarz, et al: "Viasat—Mobile Highway Survay . . . ", IEEE—IEE Vehicle Navigation & Information Systems Conference, Ottawa—VNIS'93, pp. 476-481.
Frank Yee: "GPS & Video Data Collection in Los Angeles County", IEEE, 1994, pp. 388-393.
John D. Bossler: "Using the GPSVAN: Operational Efficiencies . . . " 8081 Annual Review of Communications, 48 (1994/95), Chicago, IL, pp. 833-835.0.

* cited by examiner

*Primary Examiner*—Anand Rao
*Assistant Examiner*—Behrooz Senfi
(74) *Attorney, Agent, or Firm*—Michael J. Striker

(57)    ABSTRACT

The method for producing road or street section data for a digital map includes providing a vehicle (7) with an image producing device (1) for generating image data of surroundings of the vehicle and a position determining device (4) for generating vehicle position data; driving the vehicle over at least one road or street section (8) and at the same time simultaneously collecting the image data with the image producing device (1) and acquiring the vehicle position data with the position determining device (4); analyzing the image data with an image processing device (2), in order to assemble a road or street section description; and correlating the vehicle position data and the road or street section description with a correlation device, in order to produce the road or street section data for the digital map. The invention also includes an apparatus for producing the road or street section description according to the method of the invention.

21 Claims, 4 Drawing Sheets

METHOD AND DEVICE FOR PRODUCING ROAD AND STREET DATA FOR A DIGITAL MAP

BACKGROUND OF THE INVENTION

1. Field of the Invention

The present invention relates to a method and device for generating or producing road and/or street data for a digital map.

2. Description of the Related Art

Digital maps find application, for example, in connection with vehicle navigation systems. Currently this sort of digital map is put together with the aid of pre-existing printed maps. Especially the courses of the roads and streets (i.e. positions of successive points over which the roads and streets extend) are acquired and digitally coded for this purpose. The known methods for digitizing a printed map provide for manually acquiring the courses of the roads and streets using a digitizing tablet. Thus the streets and roads to be digitized must already be mapped. This method is very labor-intensive and expensive however a high quality digital map is the result. Another known method for digitization of map data comprises scanning the map material and vectoring the scanned data by image processing methods. The courses of the streets and roads can be extracted from vectors obtained from the vectoring. This latter method requires little manual work but can lead to quality problems in the resulting digital map due to unmonitored automatic image processing. To reliably update the digital map, independently of the method used for the digitalization of the map material, the courses of the roads and streets must be continually monitored and checked. For example, the work required for producing or updating a digital map is increased because of new street and road construction and other construction, which changes the courses of the roads and streets temporarily or permanently.

SUMMARY OF THE INVENTION

It is an object of the present invention to provide a method of generating or updating road and street data for a digital map, which does not suffer from the above-described disadvantages.

It is another object of the present invention to provide a device for performing the method of generating or updating road and street data for a digital map according to the invention.

The method for producing road or street section data for a digital map comprises the steps of:

a) driving a vehicle over at least one road or street section, which is equipped with an image producing device, which supplies image data of the vehicle's surroundings, and a position determining device for producing vehicle position data;

b) during the driving of the vehicle of step a), simultaneously collecting the image data with the image producing device and acquiring the vehicle position data with the position determining device;

c) analyzing the image data with an image processing means in order to put together a road or street section description; and d) correlating the vehicle position data and the road or street section description with a correlation means in order to produce the road or street section data for the digital map.

This method according to the invention for producing road or street section data for a digital map produces a digital map, which is of a higher quality more simply than the methods according to the prior art. Furthermore the road or street section data for the digital map can be produced at any time by travel over the at least one road or street, without using a printed map, which is required according to the state of the art. The method of the invention can be especially important due to new construction of roads or streets or not previously mapped regions.

In a preferred embodiment of the method according to the invention the image producing device comprises at least one camera. This camera supplies the image data of the surroundings around the vehicle.

According to other embodiments of the invention the image producing device can be a monocular image generating device or a stereoscopic image generating device. In each case the image data produced by the image producing device must be suitable so that a road or street section description can be obtained from it, which is explained in more detail hereinbelow.

Preferably the method according to the invention provides that the vehicle position data comprises the absolute positions of the vehicle on the at least one road or section in relation to a fixed first coordinate system.

A suitable positioning device generates the vehicle position data. The positioning device can be, for example, a GPS system or a differential GPS system. In this case the fixed first coordinate system can comprise longitude and latitude coordinates. Likewise it is conceivable that the origin of the fixed first coordinate system is arbitrarily established or fixed, for example, so that it coincides with an origin of the digital map to be produced.

So that accurate information can be acquired regarding the traveled road or street section, it is advantageous when the vehicle position data include the orientation of the vehicle in relation to the fixed first coordinate system. If the road or street description based on the image data from the image producing device includes, for example, a statement regarding the distance of the lane edge to the origin a second coordinate system traveling with the vehicle or to the longitudinal axis of the vehicle, accurate information regarding, for example, the course of the road edge in regard to the first coordinate system can be obtained.

In various embodiments of the method according to the invention the road or street description based on the image data from the image producing device preferably includes one or more of the following data: a course of the at least one road or street section relative to the vehicle, a spacing between a vehicle longitudinal axis and a street or road edge, a width of the at least one street or road section, a number of lanes, a curvature of the at least one street or road section, standing or parking space information, cycle lane information, lane quality information, traffic sign information, building information or alternative lane guidance. The information content of the digital map can be considerably increased in comparison to the state of the art in accordance with the amount of data in the mad or street section description. A digital map can be produced which reproduces the actual current state of the road or street sections with a predetermined suitable accuracy by means of the method according to the invention, Thus a vehicle can be more or less automatically guided over the roads or streets based on the information content of that digital map.

Independently of which data are included in the road or street section description, it is preferred that the road or street section data gives the road or street section description at least partially in relation to the first coordinate system.

In this connection it is also preferred that the road or street section data includes data regarding the course of the respective road or street sections in relation to the first coordinate system. However embodiments are conceivable in which the road or street section data include statements or data regarding the course of the road or street sections in relation to an arbitrary fixed coordinate system. In this latter case a suitable coordinate transformation must be performed.

In preferred embodiments of the method according to the invention the method includes the following additional step: comparing the road or street section data produced by the method with corresponding road or street section data from a pre-existing digital map by means of a comparison means in order to detect contingent deviations. This additional method step can be useful, especially for monitoring the accuracy of the digital map.

These latter preferred embodiments also preferably include the step of correcting or updating the pre-existing digital map using the contingent deviations detected by the comparing.

Additional embodiments of the method according to the invention can include transmission of the contingent deviations and/or the road or street section data to a central station with the help of a suitable communication means, which receives the aforesaid data. For example, the communication means can be a mobile radio device, which operates according to the GSM standard or UMTS standard or some other suitable standard.

The present invention also includes each and every device that is designed to perform the method according to the invention.

The device for producing road or street section data for a digital map according to the invention comprises

- a vehicle for traveling over roads or streets, which includes an image producing device for generating image data of surroundings of the vehicle and a position determining device for generating vehicle position data in relation to a fixed first or stationary coordinate system;
- an image processing means for analyzing the image data to produce a road or street section description, which includes at least one statement regarding a course of at least one road or street section in relation to a movable second coordinate system which moves in relation to the first fixed or stationary coordinate system; and
- a correlation means for correlating vehicle position data and road or street section description in order to produce the road or street section data for the digital map in relation to the first fixed or stationary coordinate system.

The device according to the invention produces a highly accurate digital map in a simple way. The device according to the invention, as described above, performs the method according to the invention. Hardware and/or software interfaces can be provided for supplying the vehicle position data and road or street section description to the correlation means.

Also it is preferable that road or street section description includes a course of the at least one road or street section relative to the vehicle, a spacing between a vehicle longitudinal axis and a street or road edge, a width of the at least one street or road section, a width of the lane in which the vehicle travels, a number of lanes on the at least one road or street section, a curvature of the at least one street or road section, standing or parking space information, cycle lane information, lane quality information, traffic sign information, building information, building information or alternative lane guidance. In addition, other information or data may be included. The above-described description can be completed in a suitable manner, as needed, by one skilled in the art, for each special application.

In preferred embodiments of the device according to the invention so that an existing digital map can be updated so that it is more accurate, the device according to the invention is provided with comparison means. The comparison means compares the road or street section data that is produced with corresponding road or street section data of a pre-existing digital map to detect contingent deviations, which are used to update the digital map.

Furthermore communication means for exchange of data with a central station can be provided in the device according to the invention. Especially the communication means can be a mobile radio device.

The communication means can include especially means for transmission of the contingent deviations to a central station for reception by the central station. In each case the contingent deviations can be temporarily stored and then used to update the digital map.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
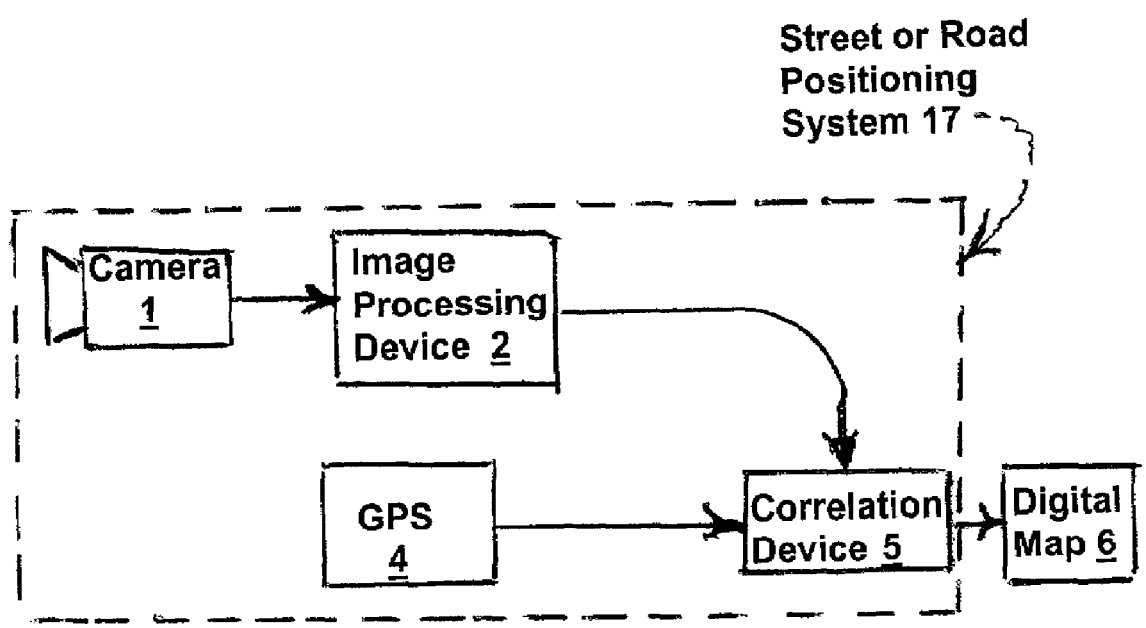
FIG. 1 is a block diagram of a first embodiment of a device for performing the method according to the invention.

FIG. 1 shows a block diagram of a first embodiment of a device for performing the method according to the invention. According to FIG. 1 an image producing device 1, for example a video camera, feeds or inputs image data of the vehicle surroundings to an image processing device 2. The image-processing device 2 analyses the image data, in order to put together a street or road section description in a suitable data format. The street or road section description, for example, can include one or more of the following statements: a course of the road or street section 8 relative to the vehicle 7, a distance 10 between the vehicle longitudinal axis L and the street or road edge E, a width 12 of the street or road section 8, a number of lanes 9 on the road or street section, a width 11 of the lane 9 in which the vehicle travels, a curvature of the street or road section 8, standing or parking space information, cycle lane information, lane quality information, traffic sign information, building information or alternative lane guidance. The image processing device 2 feeds or inputs the street or road section description into a correlation device 5 in a suitable data format. A suitable position determining device 4, which for example is a GPS system, acquires the actual position (position coordinates) of the vehicle and generates vehicle position data in a suitable format. The vehicle position data comprises the absolute position (position coordinates) of the vehicle 7 in relation to a stationary first coordinate system 24. The vehicle position data also includes the orientation of the vehicle 7 in relation of the origin of the first coordinate system 24. The position determining device 4 inputs or feeds the vehicle position data into the correlation device 5 in a suitable format. The correlation device 5 correlates the vehicle position data and the street or road section description in order to produce the road section data for the digital map 6. The components, image producing device 1, image processing device 2, position determining device 4 and correlation device 5, taken together are designated as the street or road positioning system 17.

Figure 2:
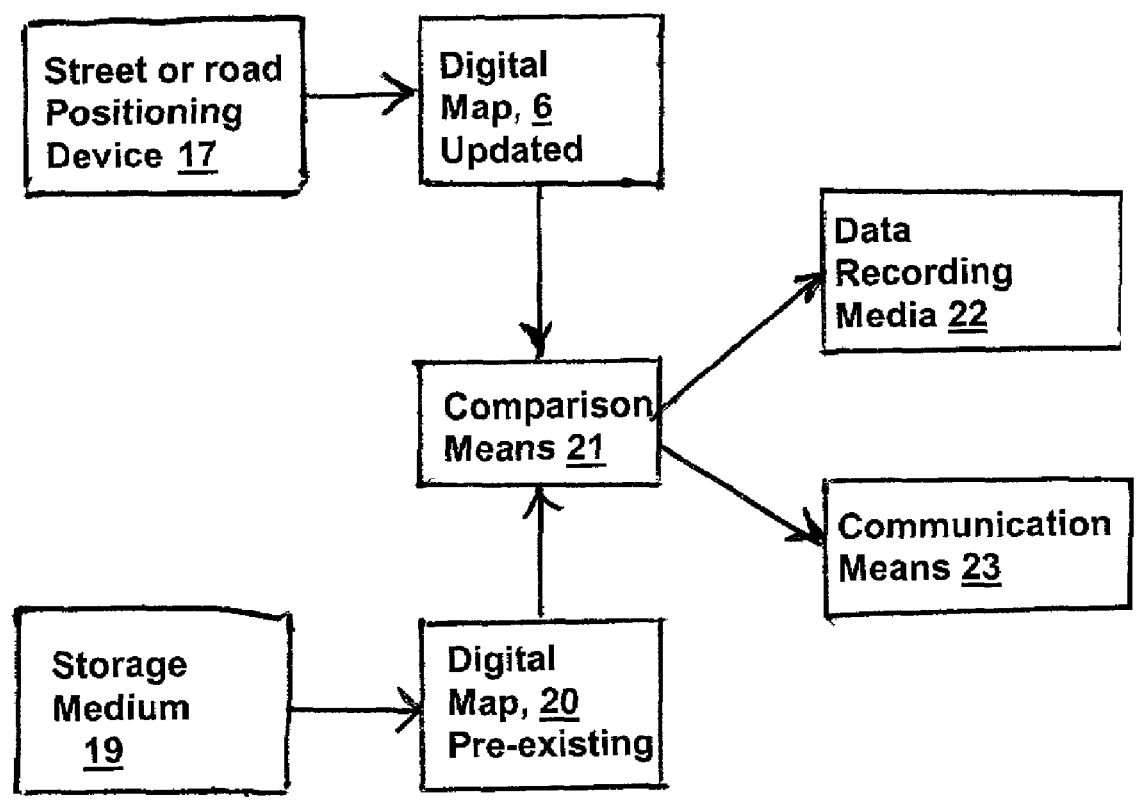
FIG. 2 is a block diagram of a second embodiment for performing the method according to the invention.

FIG. 2 shows a block diagram of a second embodiment of a device for performing the method according to the invention. The components, image producing device 1, image processing device 2, position determining device 4 and correlation device 5, illustrated together in FIG. 1 are designated with 17 in FIG. 2. The street or road positioning system 17 produce street or road section data for a digital map 6. Storage medium 19 outputs an already existing or pre-existing digital map 20. Comparison means 21 compares the street or road section data of the digital map 6 or the generated street or road section data with corresponding street or road data of the already existing or pre-existing digital map 20, in order to detect contingent variations or deviations. The comparison means 21 inputs the comparison results, or contingent deviations that are detected, to a data recording medium 22 and/or a communication means 23. The communication means, which, for example, can be a mobile radio device, transmits the appropriate data to a central station that is not illustrated in FIG. 2. The device shown in FIG. 2 can perform a second embodiment of the method according to the invention. In this second embodiment a pre-existing digital map can be checked with the actual situation on the streets or roads and, if necessary, it can be changed or updated in an appropriate manner to correspond to the actual situation.

Figure 3:
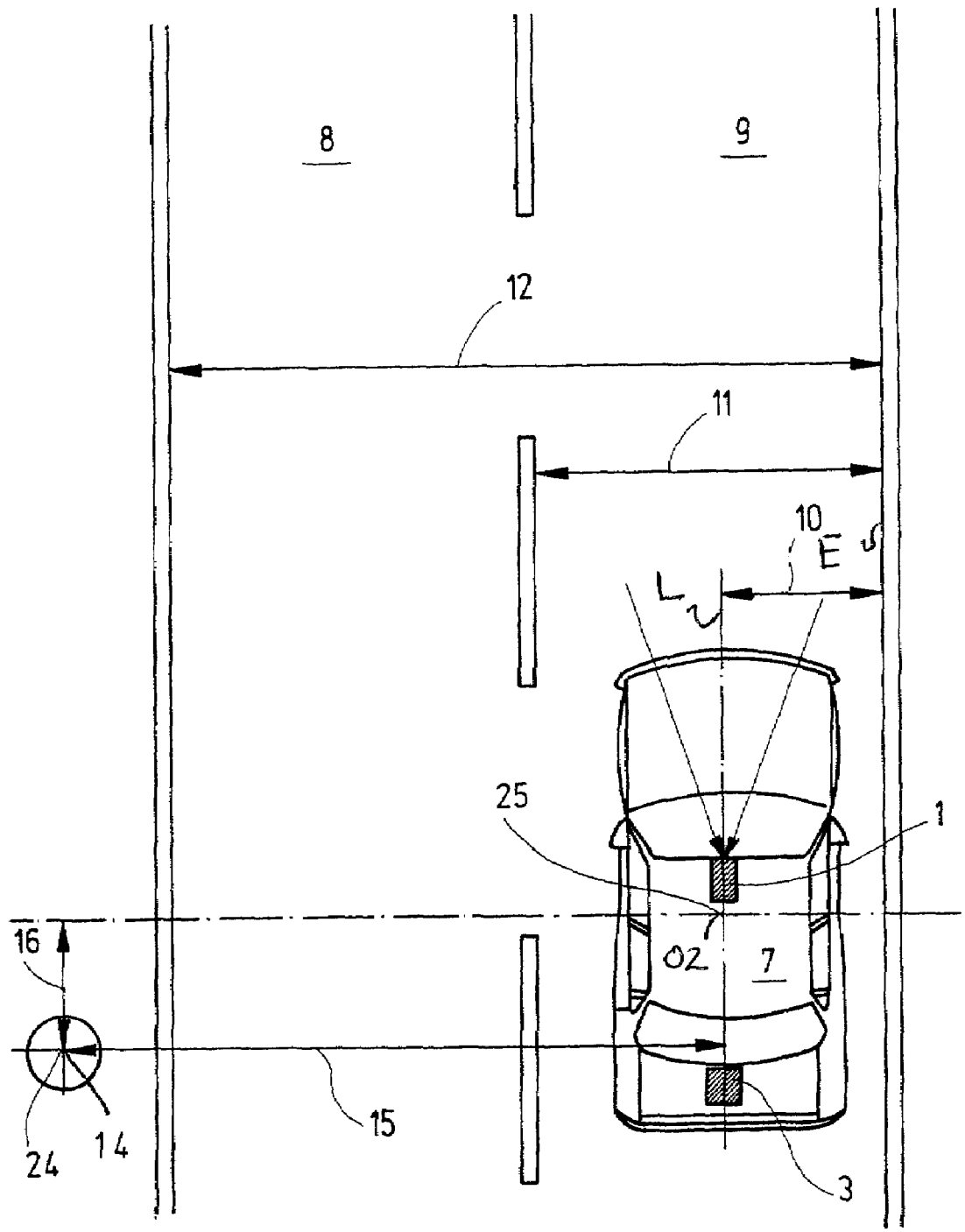
FIG. 3 is an illustration of the basic principal of the method according to the invention.

FIG. 3 illustrates the basic principal of the inventive method. It shows a mad or street section 8. A vehicle 7 is located in a lane 9 of the street section 8. The width 12 of the road or street section 8 is indicated in FIG. 3 by a suitable arrow. The same is true of the width 11 of the lane 9. The spacing 10 of the longitudinal axis L of the vehicle 7 to the edge E of the lane 9 is illustrated by another arrow. The longitudinal axis L of the vehicle 7 together with a suitable transverse axis forms a second moving coordinate system 25, which is associated with the vehicle 7. A stationary first coordinate system 24 is indicated with 24 and has an origin 14. The vehicle 7 is equipped with an image producing device 1 in the form of a camera. The camera 1 supplies image data of the vehicle's surroundings. These image data are analyzed by an image processing device 2 not shown in detail in FIG. 3, in order to put together a street or road section description. This Street or road section description, for example, can include a statement of the width 12 of the street or road section 8, the width 11 of the lane and so forth. Especially the street or road section description includes the distance 10 of the origin 02 of the second coordinate system to the E edge of the lane. The vehicle 7 is equipped with a position determining device 3, which supplies the vehicle position data, which include the absolute position of the vehicle in relation to the fixed first coordinate system 24. This vehicle position data can be a pair of position coordinates 15, 16 for the vehicle position in relation to the origin in 14 of the fixed first coordinate system 24. In FIG. 3 the unshown correlation means correlates the vehicle position data and the street or road section description, in order to produce road or street section data for the digital map 6. The road or street section data provided by the correlation means that is not shown in FIG. 3 contains at least one statement regarding the course of the street or road section 8 in relation to the first coordinate system.

Figure 4:
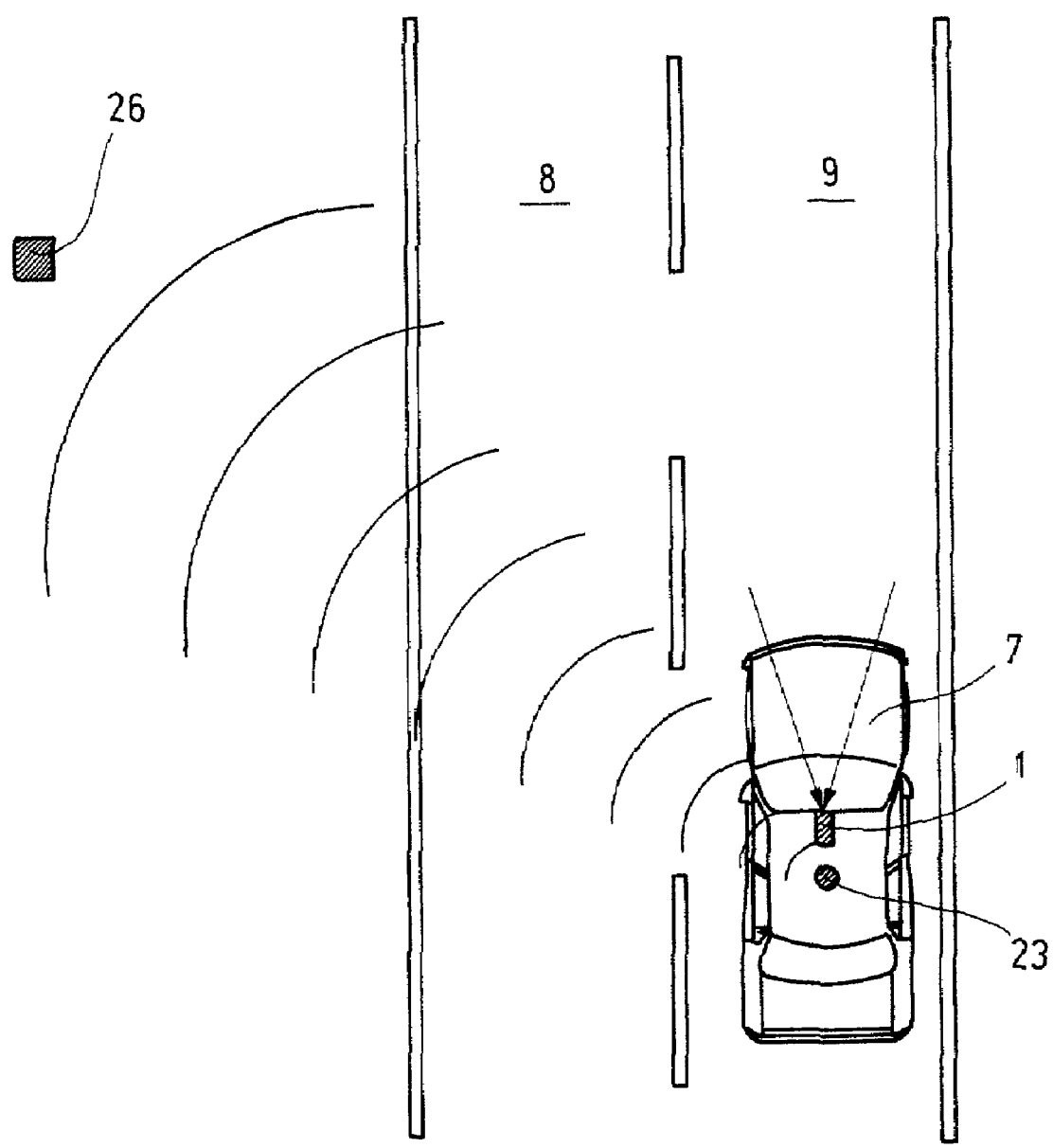
FIG. 4 is a diagrammatic illustration that shows transmission of road and street data to a central station.

FIG. 4 is an illustration showing transmission of road or street section data to a central station. According to the illustration in FIG. 4 the vehicle 7 is equipped with a communication means 23, which can transfer data to a central station 26. The data transmitted to the central station 26, for example, can be the road or street section data, components thereof or information obtained at least therefrom. Similarly it is possible to transmit information regarding the contingent deviations between the generated road or street section data and corresponding road or street section data of the pre-existing digital map 19.

With the aid of the method and device according to the invention digital maps can be produced in a simple manner. Furthermore already existing or pre-existing digital maps can be checked for their accuracy and corrected if need be. In this connection, for example, it is possible to acquire data regarding long-term building or change of the course of the roads or streets or the road or street width. In so far as an already existing or pre-existing digital map is maintained in a central station, it is possible to continually correct this digital map with the help of a fleet of vehicles, which transmit appropriate road or street section data to the central station.

In this connection the transmission of data back from the central station to one or more vehicles should be considered. The transmitted data, for example, road or street section data, can be used to update the existing map data in the vehicles.

The disclosure in German Patent Application 100 65 593.9 of Dec. 28, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described in the foregoing detailed description as embodied in a method and device for generating or producing road or street data for a digital map, it is not intended to be limited to the details shown therein, since various modifications and changes may be made without departing in any way from the broad concept of the present invention as stated in the appended claims.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method of producing road or street section data for a digital map, said method comprising the steps of:
   a) providing a vehicle (7) comprising an image producing device (1) and a position determining device (4), said image producing device (1) comprising means for generating image data of surroundings of the vehicle and said position determining device (4) comprising means for generating vehicle position data, said surroundings of said vehicle including at least one road or street section (8) on which said vehicle (7) is driven;

b) driving said vehicle on said at least one road or street section (8);

c) during the driving of the vehicle of step b), simultaneously collecting said image data of said surroundings including said at least one road or street section (8) with said image producing device (1) and acquiring said vehicle position data with said position determining device (4);

d) analyzing said image data with an image processing means (2) to put together or assemble a road or street section description, wherein said road or street section description obtained from said image data includes changes in pre-existing road or street section data of a pre-existing digital map due to road construction;

e) correlating said vehicle position data and said road or street section description obtained in step d) with a correlation means (5), in order to produce said road or street section data for said digital map; and f) comparing said road or street section data produced in step e) with said pre-existing road or street section data by means of a comparison means (21) in order to update said pre-existing digital map for said changes due to said road construction.

2. The method as defined in claim 1, wherein said vehicle position data comprises at least one absolute position of said vehicle (7) and an orientation of said vehicle (7) in relation to a fixed first coordinate system (24).

3. The method as defined in claim 2, wherein said origin of said fixed first coordinate system (24) coincides with an origin of said digital map.

4. The method as defined in claim 2, wherein the road or street section data includes a statement regarding a course of at least one road or street section (8) in relation to said fixed first coordinate system (24).

5. The method as defined in claim 1, further comprising transmitting said road or street section data produced by said correlating to a central station (26) for reception by the central station (26).

6. A method of producing road or street section data for a digital map, said method comprising the steps of:

a) providing a vehicle (7) comprising an image producing device (1) and a position determining device (4), said image producing device (1) comprising means for generating image data of surroundings of the vehicle and said position determining device (4) comprising means for generating vehicle position data, said surroundings of said vehicle including at least one road or street section (8) on which said vehicle (7) is driven;

b) driving said vehicle on said at least one road or street section (8);

c) during the driving of the vehicle of step b), simultaneously collecting said image data of said surroundings including said at least one road or street section (8) with said image producing device (1) and acquiring said vehicle position data with said position determining device (4);

d) analyzing said image data with an image processing means (2) to put together or assemble a road or street section description, wherein said road or street section description obtained from said image data includes road construction information regarding changes in pre-existing road or street section data of a pre-existing digital map, cycle lane information, a course of the at least one road or street section (8) relative to the vehicle (7), a spacing (10) between a vehicle longitudinal axis (L) and a street or road edge (E), a width (12) of the at least one street or road section (8), a number of lanes (9) on the at least one road or street section (8), a width (11) of a lane (9) in which the vehicle (7) travels and a curvature of the at least one street and road section (8);

e) correlating said vehicle position data and said road or street section description with a correlation means (5), in order to produce said road or street section data for said digital map; and f) comparing said road or street section data produced in step e) with said pre-existing road or street section data by means of a comparison means (21) in order to update said pre-existing digital map for said changes due to road construction.

7. The method as defined in claim 6, wherein said vehicle position data comprises at least one absolute position of said vehicle (7) and an orientation of said vehicle (7) in relation to a fixed first coordinate system (24).

8. The method as defined in claim 7, wherein said origin of said fixed first coordinate system (24) coincides with an origin of said digital map.

9. The method as defined in claim 6, wherein said road or street section description obtained from said image data includes standing or parking space information, traffic sign information, and alternative lane guidance.

10. The method as defined in claim 7, wherein the road or street section data includes a statement regarding a course of at least one road or street section (8) in relation to said fixed first coordinate system (24).

11. The method as defined in claim 6, further comprising transmitting said road or street section data produced by said correlating to a central station (26) for reception by the central station (26).

12. The method as defined in claim 6, wherein said image producing device (1) comprises at least one camera.

13. The method as defined in claim 6, wherein said image producing device (1) comprises a monocular image generating device.

14. The method as defined in claim 6, wherein said image producing device (1) comprises a stereoscopic image generating device.

15. A device for producing road or street section data for a digital map, said device comprising a vehicle (7) for traveling on roads or streets, said vehicle comprising an image producing device (1) for generating image data of surroundings of the vehicle and a position determining device (4) for generating vehicle position data in relation to a fixed first coordinate system (24), said surroundings of said vehicle including at least one road or street section (8) on which said vehicle (7) is driven;

image processing means (2) for analyzing said image data of said surroundings of said vehicle including said at least one road or street section (8) to produce a road or street section description, said road or street section description obtained from said image data including cycle lane information, road construction information regarding changes in pre-existing road or street section data of a pre-existing digital map, a course of the at least one road or street section (8) relative to the vehicle (7), a spacing (10) between a vehicle longitudinal axis (L) and a street or road edge (E), a width (12) of the at least one street or road section (8), a number of lanes (9) on the at least one road or street section (8), a width (11) of a lane (9) in which the vehicle (7) travels, a curvature of the at least one street or road section (8), standing and parking space information and alternative lane guidance;

correlation means (5) for correlating said vehicle position data and said road or street section description obtained from said image data in order to produce said road or street section data for said digital map in relation to said fixed first coordinate system (24); and comparison means (21) for comparing said road or street section data that are produced with said pre-existing road or street section data of said pre-existing digital map (19) in order to detect contingent deviations.

16. The device as defined in claim 15, further comprising communication means (23) for exchange of information entities to a central station (26) and for transmission of said road or street section data and/or said contingent deviations to said central station.

17. The device as defined in claim 15, further comprising an interface device for supplying said vehicle position data and said road or street section description obtained from said image data to said correlation means and wherein said interface device is a hardware device or a software device.

18. The method as defined in claim 1, wherein said image producing device (1) comprises at least one camera.

19. The method as defined in claim 1, wherein said image producing device (1) comprises a monocular image generating device.

20. The method as defined in claim 1, wherein said image producing device (1) comprises a stereoscopic image generating device.

21. The method as defined in claim 1, wherein said changes in said pre-existing road or street section data include a description of courses of newly constructed roads or street sections not previously included in said pre-existing digital map.

\* \* \* \* \*